US009400912B2

(12) United States Patent
Wu

(10) Patent No.: US 9,400,912 B2
(45) Date of Patent: Jul. 26, 2016

(54) CAPACITIVE FINGERPRINT SENSOR AND FINGERPRINT SENSING METHOD THEREOF

(71) Applicant: Egis Technology Inc., Taipei (TW)

(72) Inventor: Hsu-Heng Wu, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 14/618,800

(22) Filed: Feb. 10, 2015

(65) Prior Publication Data

US 2016/0063301 A1 Mar. 3, 2016

(30) Foreign Application Priority Data

Aug. 26, 2014 (TW) .............................. 103129302 A

(51) Int. Cl.
*G06K 9/00* (2006.01)
*G06F 3/044* (2006.01)
(52) U.S. Cl.
CPC ............ *G06K 9/00033* (2013.01); *G06F 3/044* (2013.01)
(58) Field of Classification Search
None
See application file for complete search history.

(56) References Cited

U.S. PATENT DOCUMENTS

| | | | |
|---|---|---|---|
| 5,905,489 A * | 5/1999 | Takahama | ................ G06F 3/044 345/156 |
| 7,965,877 B2 | 6/2011 | Qi | |
| 2008/0116904 A1 * | 5/2008 | Reynolds | ............... G06F 3/0416 324/678 |
| 2012/0133607 A1 * | 5/2012 | Chiu | ........................ G06F 3/041 345/174 |

FOREIGN PATENT DOCUMENTS

| | | |
|---|---|---|
| CN | 102063232 A | 5/2011 |
| CN | 102954753 A | 3/2013 |
| CN | 103026326 A | 4/2013 |
| CN | 103714330 A | 4/2014 |
| TW | 201017555 A1 | 5/2010 |
| TW | 201416991 A | 5/2014 |

OTHER PUBLICATIONS

Taiwan Patent Office, Office Action, Patent Application Serial No. 103129302, Nov. 26, 2015, Taiwan.
MyungLae Lee et al., "Design, Fabrication, and Characterization of a Readout Integrated Circuit (ROIC) for Capacitive MEMS Sensors," IEEE Senosors 2007 Conference, Oct. 2007, pp. 260-263, IEEE, US.

* cited by examiner

Primary Examiner — Mark Roz

(57) ABSTRACT

A capacitive fingerprint sensor is provided. The capacitive fingerprint sensor includes a sensing array, an insulating surface disposed on the sensing array, and a readout module. The sensing array includes a plurality of sensing units, and each of the sensing units includes a sensing capacitor and a reference capacitor. When a finger contacts the insulating surface, the readout module obtains a sensing time interval corresponding to the sensing capacitor of each of the sensing units and a reference time interval corresponding to the reference capacitor of each of the sensing units during a sensing period. The readout module provides a sensing output according to the sensing time interval and the reference time interval to indicate a fingerprint ridge or a fingerprint valley of the finger.

12 Claims, 5 Drawing Sheets

CAPACITIVE FINGERPRINT SENSOR AND FINGERPRINT SENSING METHOD THEREOF

CROSS REFERENCE TO RELATED APPLICATIONS

This Application claims priority of Taiwan Patent Application No. 103129302, filed on Aug. 26, 2014, the entirety of which is incorporated by reference herein.

BACKGROUND OF THE INVENTION

1. Field of the Invention

The invention relates to a capacitive fingerprint sensor, and more particularly to a capacitive fingerprint sensor without analog-to-digital converters (ADCs).

2. Description of the Related Art

In recent years, biological identification technology has become increasingly mature, and different biological features can be used for identifying users. Since the recognition rate and accuracy of fingerprint identification technology are better than those of other biological feature identification technologies, fingerprint identification and verification are used extensively in various areas.

Fingerprint identification and verification technology detects a user's fingerprint image, captures fingerprint data from the fingerprint image, and saves the fingerprint data as a template. Thereafter, the user presses or slides the finger on or over the fingerprint sensor such that a fingerprint is captured and compared with a template. If the two match, then the user's identity is verified.

As portable devices become increasingly popular, using portable electronic devices to input fingerprint data is becoming a trend. Therefore, a fingerprint sensor with a smaller area is desired.

When a user presses or slides his finger on or over the fingerprint sensor, a conventional capacitive fingerprint sensor will sense the ridges and the valleys of the fingerprint, and generate different capacitance values corresponding to the ridges and valleys. Next, voltage values corresponding to the capacitance values are obtained by using a charge-sharing technique, and the voltage value is input to an analog-to-digital converter (ADC) for converting the voltage value into a digital code. The digital code is provided to a processor for subsequent operation and fingerprint identification.

BRIEF SUMMARY OF THE INVENTION

A capacitive fingerprint sensor and a fingerprint sensing method thereof are provided. An embodiment of a capacitive fingerprint sensor is provided. The capacitive fingerprint sensor comprises a sensing array, an insulating surface disposed on the sensing array, and a readout module. The sensing array comprises a plurality of sensing units, wherein each of the sensing units comprises a sensing capacitor and a reference capacitor. When a finger contacts the insulating surface, the readout module obtains a sensing time interval corresponding to the sensing capacitor of each of the sensing units, and a reference time interval corresponding to the reference capacitor of each of the sensing units during a sensing period. The readout module provides a sensing output according to the sensing time interval and the reference time interval to indicate a fingerprint ridge or a fingerprint valley of the finger.

Furthermore, an embodiment of a fingerprint sensing method for a capacitive fingerprint sensor is provided, wherein the capacitive fingerprint sensor comprises a sensing array having a plurality of sensing units and an insulating surface disposed on the sensing array. When a finger contacts the insulating surface, a sensing time interval corresponding to a sensing capacitor of each of the sensing units is obtained, and a reference time interval corresponding to a reference capacitor of each of the sensing units during a sensing period is obtained. A sensing output is provided to indicate a fingerprint ridge or a fingerprint valley of the finger according to the sensing time interval and the reference time interval.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
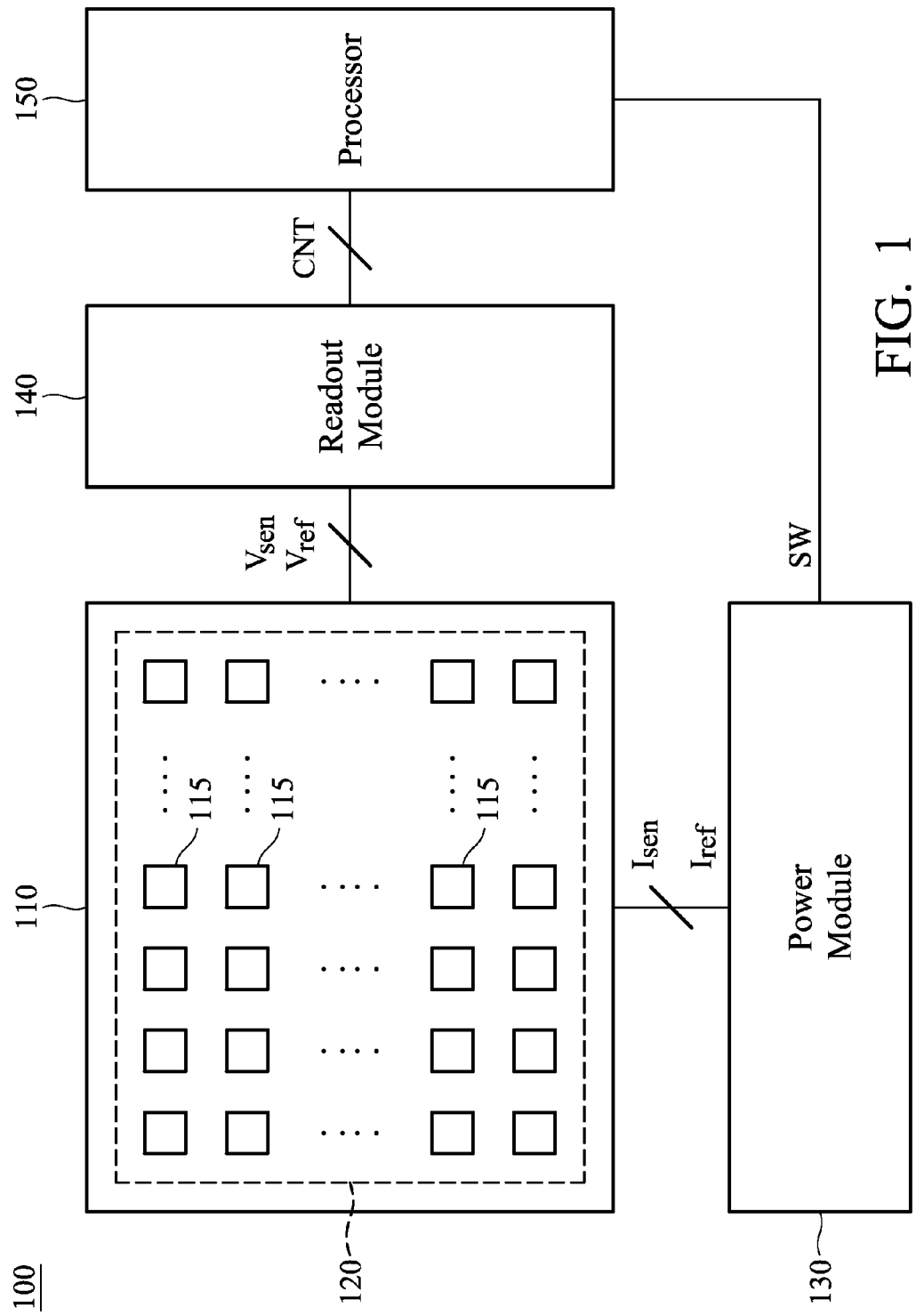
FIG. 1 shows a fingerprint sensor according to an embodiment of the invention.

FIG. 1 shows a fingerprint sensor 100 according to an embodiment of the invention. The fingerprint sensor 100 comprises a sensing array 110, an insulating surface 120, a power module 130, a readout module 140 and a processor 150. In the embodiment, the sensing array 110, the power module 130, the readout module 140 and the processor 150 are installed in a semiconductor substrate. The sensing array 110 is formed by a plurality of sensing units 115 arranged in a two-dimensional manner. The insulating surface 120 is disposed on the semiconductor substrate, and overlays the whole sensing units 115 of the sensing array 110. In response to a switching signal SW provided by the processor 150, the power module 130 provides a sensing current $I_{sen}$ and a reference current $I_{ref}$ to the sensing units 115 of the sensing array 110 during a sensing period $P_{sen}$. Furthermore, during a reset period $P_{rst}$, the power module 130 can reset the sensing units 115. Thus, during the sensing period $P_{sen}$, the readout module 140 obtains a sensing voltage $V_{sen}$ and a reference voltage $V_{ref}$ of each sensing unit 115 in the sensing array 110, and provides a sensing output CNT corresponding to each sensing unit 115 to the processor 150 according to the sensing voltage $V_{sen}$ and the reference voltage $V_{ref}$. Next, the processor 150 determines whether a finger of a user contacts the insulating surface 120 according to the sensing outputs CNT of all of the sensing units 115, and determines that the sensing output CNT corresponds to a fingerprint ridge or a fingerprint valley of the finger according to the sensing output CNT of each sensing unit 115. Thus, according to the sensing outputs CNT of all sensing units 115, the processor 150 obtains the binary or gray-level fingerprint data for subsequent processes, for example, a fingerprint identification operation is performed by a fingerprint identification algorithm.

Figure 2:
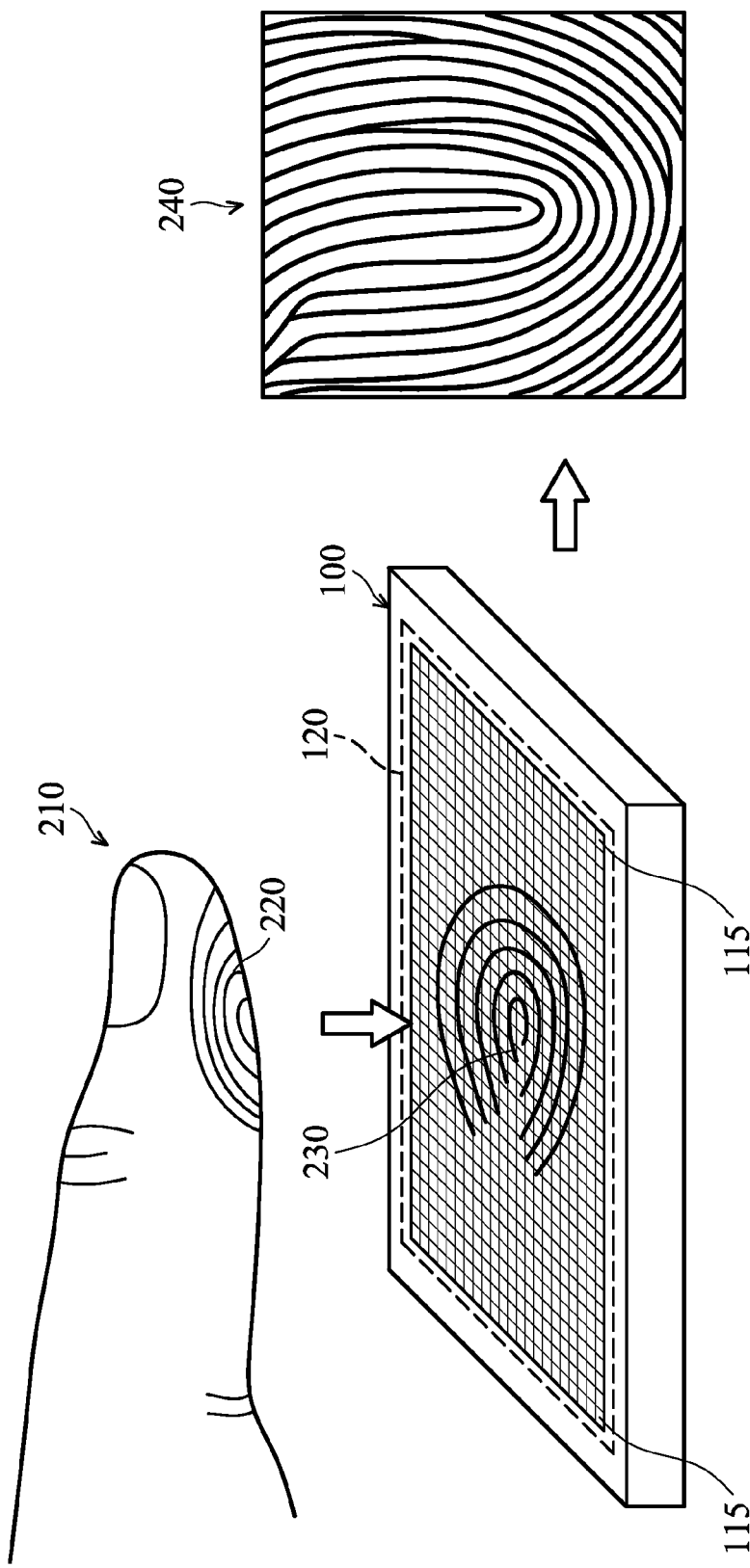
FIG. 2 shows a schematic illustrating that the fingerprint sensor of FIG. 1 is used to obtain the fingerprint of the user.

FIG. 2 shows a schematic illustrating that the fingerprint sensor 100 of FIG. 1 is used to obtain the fingerprint of the user. In FIG. 2, when the finger 210 contacts the fingerprint sensor 100, the irregular fingerprint ridges 220 on the surface of the finger 210 will contact and press the sensing units 115 via the insulating surface 120. Thus, the fingerprint sensor 100 obtains a capacitance curve 230 corresponding to the fingerprint ridges 220, and identifies the shape of the fingerprint ridges 220 according to the shape of the capacitance curve 230, so as to obtain a fingerprint pattern 240. Next, the other circuits or devices can perform subsequent processes according to the fingerprint pattern 240.

Figure 3:
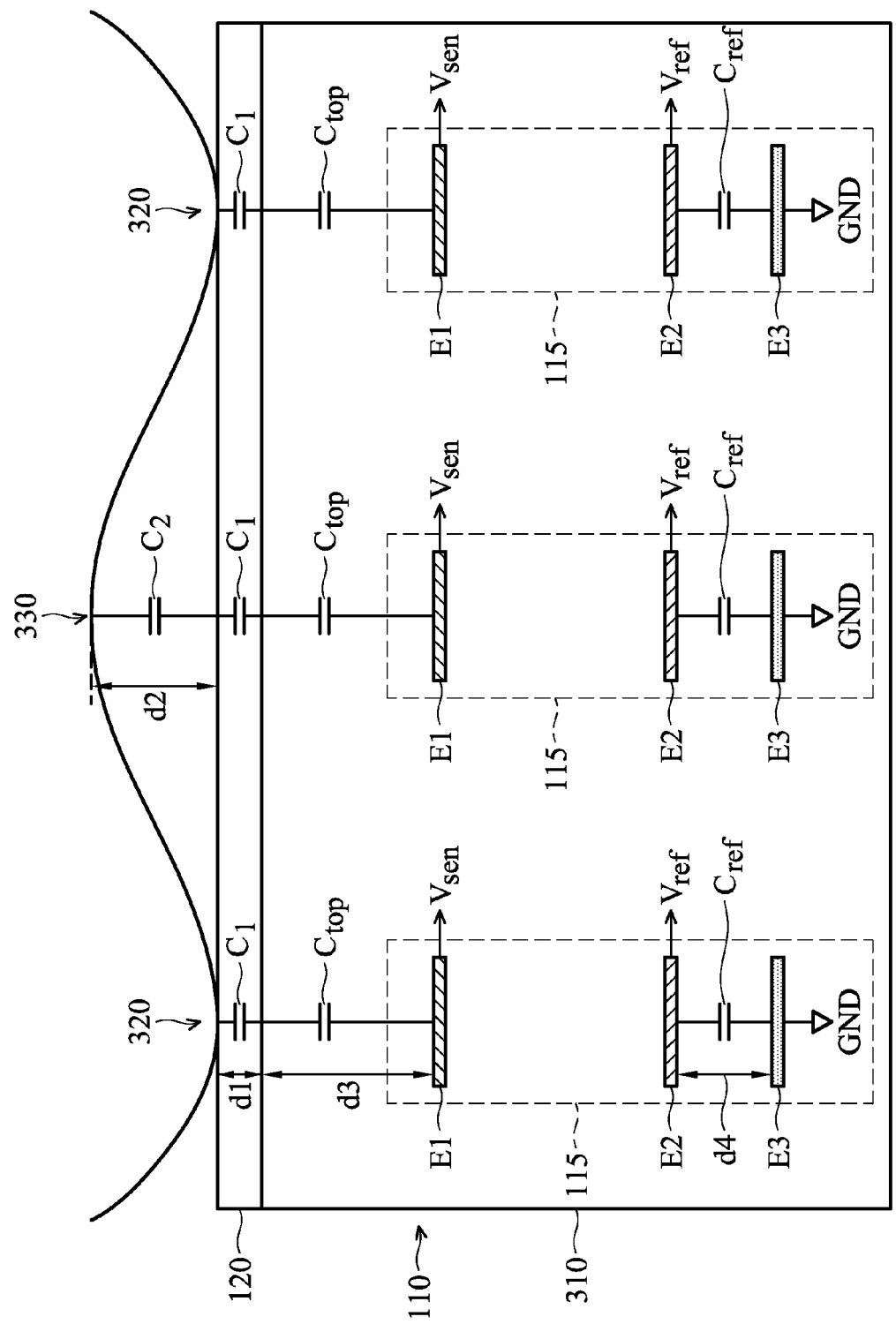
FIG. 3 shows a sectional schematic illustrating that the finger of the user contacts the fingerprint sensor of FIG. 1.

FIG. 3 shows a sectional schematic illustrating the finger of the user contacting the fingerprint sensor 100 of FIG. 1. In FIG. 3, the insulating surface 120 is disposed on the semiconductor substrate 310. In general, the insulating surface 120 is a protective dielectric layer formed by performing the integrated circuit manufacturing process. The thickness of the insulating surface 120 is d1, wherein an equivalent capacitor $C_1$ of the insulating surface 120 is determined by the thickness d1. Label 320 represents a fingerprint ridge of the finger, wherein the fingerprint ridge 320 of the finger will directly contact the insulating surface 120. Moreover, Label 330 represents a fingerprint valley of the finger, wherein a distance between the fingerprint valley 330 of finger and the insulating surface 120 is d2, and a capacitor $C_2$ between the fingerprint valley 330 and insulating surface 120 is determined by the distance d2. As described above, the sensing array 110 is formed by a plurality of sensing units 115. Each sensing unit 115 comprises the electrodes E1, E2 and E3, wherein the electrodes E1, E2 and E3 are formed by different metal layers within the semiconductor substrate 310. The electrode E1 is formed by a top metal layer and is disposed below the insulating surface 120, and the thickness of an insulation layer between the insulating surface 120 and the electrode E1 is d3, wherein an equivalent capacitor $C_{top}$ in the insulation layer is determined according to the thickness d3. Therefore, when the fingerprint ridge 320 contacts the insulating surface 120, a sensing capacitor $C_{sen}$ between the fingerprint ridge 320 and the electrode E1 is formed by the capacitor $C_{top}$ and the capacitor $C_1$ connected in series. Furthermore, compared with the sensing capacitor $C_{sen}$ of the fingerprint ridge 320, a sensing capacitor $C_{sen}$ between the fingerprint valley 330 and the electrode E1 is formed by the capacitor $C_{top}$, the capacitor $C_1$ and the capacitor $C_2$ connected in series. Thus, when the finger contacts the insulating surface 120, the fingerprint ridge 320 and the fingerprint valley 330 will cause different capacitances, wherein the sensing capacitor $C_{sen}$ corresponding to the fingerprint valley 330 is smaller than the sensing capacitor $C_{sen}$ corresponding to the fingerprint ridge 320. Therefore, the readout module 140 of FIG. 1 can obtain the sensing voltage $V_{sen}$ corresponding to the sensing capacitor $C_{sen}$ via the electrode E1. Moreover, the electrode E2 is disposed below the electrode E1, and the electrode E3 is disposed below the electrode E2, wherein the electrode E3 is coupled to a ground GND. The thickness of the insulation layer between the electrode E2 and the electrode E3 is d4, and an equivalent capacitor $C_{ref}$ of the insulation layer is determined by the thickness d4. Therefore, the readout module 140 of FIG. 1 can obtain the reference voltage $V_{ref}$ corresponding to the reference capacitor $C_{ref}$ via the electrode E2.

Figure 4:
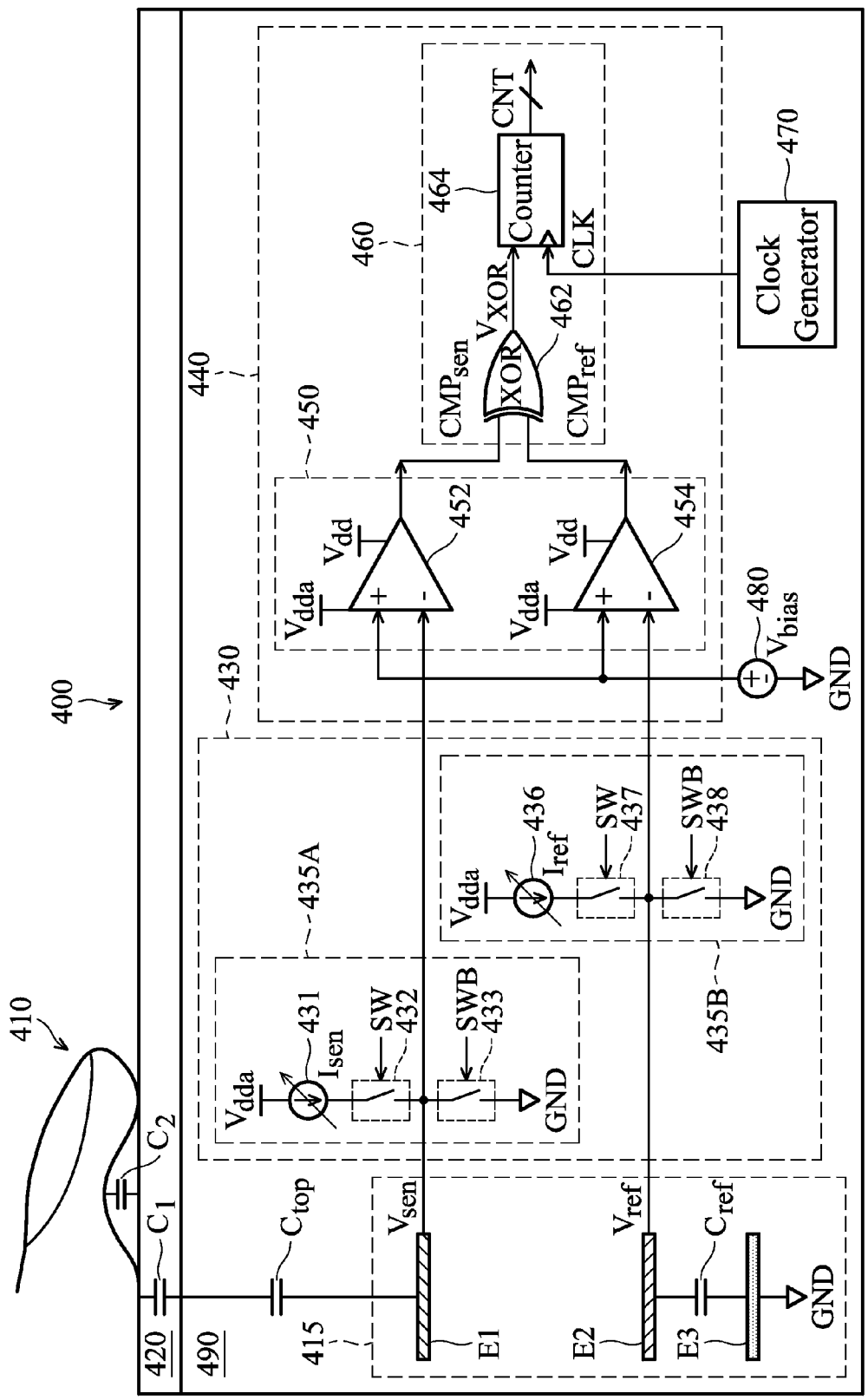
FIG. 4 shows an example schematic illustrating a fingerprint sensor according to the embodiment of FIG. 1.

FIG. 4 shows an example schematic illustrating a fingerprint sensor 400 according to the embodiment of FIG. 1. The fingerprint sensor 400 comprises an insulating surface 420, a sensing array formed by a plurality of sensing units 415, a power module 430 and a readout module 440 and a processor (not shown), wherein the sensing units 415, the power module 430 and the readout module 440 and the processor are installed in a semiconductor substrate 490, and the insulating surface 420 is disposed on the semiconductor substrate 490. The sensing unit 415 comprises the electrodes E1, E2 and E3, wherein the electrodes E1 and E2 are also coupled to the power module 430 and the readout module 440. The power module 430 comprises a switching unit 435A and a switching unit 435B. The switching unit 435A comprises a current source 431 and the switches 432 and 433. The current source 431 is coupled between an analog voltage source $V_{dda}$ and the switch 432, and is capable of providing a sensing current $I_{sen}$. The switch 432 is coupled between the current source 431 and the electrode E1 of the sensing unit 415, wherein the switch 432 is controlled by the switching signal SW from the processor. The switch 433 is coupled between the electrode E1 of the sensing unit 415 and the ground GND, wherein the switch 433 is controlled by a switching signal SWB, and the switching signal SW and the switching signal SWB are complementary. Similarly, the switching unit 435B comprises a current source 436 and the switches 437 and 438. The current source 436 is coupled between the analog voltage source $V_{dda}$ and the switch 437, and is capable of providing the reference current $I_{ref}$. The switch 437 is coupled between the current source 436 and the electrode E2 of the sensing unit 415, wherein the switch 437 is controlled by the switching signal SW. The switch 438 is coupled between the electrode E2 of the sensing unit 415 and the ground GND, wherein the switch 438 is controlled by the switching signal SWB. In the power module 430, when the switches 432 and 437 are turned on by the switching signal SW and the switches 433 and 438 are turned off by the switching signal SWB, the current sources 431 and 436 respectively provide the sensing current $I_{sen}$ and the reference current $I_{ref}$ to the electrodes E1 and E2 of the sensing unit 415, so as to charge the sensing capacitor $C_{sen}$ and the reference capacitor $C_{ref}$. Conversely, when the switches 432 and 437 are turned off by the switching signal SW and the switches 433 and 438 are turned on by the switching signal SWB, the electrodes E1 and E2 of the sensing unit 415 are coupled to the ground GND, so as to reset the sensing capacitor $C_{sen}$ and the reference capacitor $C_{ref}$. It should be noted that the sensing current $I_{sen}$ and the reference current $I_{ref}$ can be adjusted according to actual application.

In FIG. 4, the readout module 440 comprises a comparing unit 450 and a determining unit 460. The comparing unit 450 comprises the comparators 452 and 454. Both the non-inverting (positive) input terminals of the comparators 452 and 454 are coupled to a voltage source 480 for receiving a bias signal $V_{bias}$. It should be noted that the bias signal $V_{bias}$ can be adjusted according to actual applications. An inverting input terminal of the comparator 452 is coupled to the electrode E1 of the sensing unit 415 for receiving the sensing voltage $V_{sen}$. Therefore, the comparator 452 can compare the sensing voltage $V_{sen}$ with the bias signal $V_{bias}$ to obtain a comparison result $CMP_{sen}$ (i.e. the sensing time interval). It is to be noted that the comparator 452 comprises a level shifter, which is capable of converting a high level of the comparison result $CMP_{sen}$ from an analog power level $V_{dda}$ into a digital power level $V_{dd}$. In general, the analog power level $V_{dda}$ is greater than the digital power level $V_{dd}$. Furthermore, an inverting input terminal of the comparator 454 is coupled to the electrode E2 of the sensing unit 415 for receiving the reference voltage $V_{ref}$. Therefore, the comparator 454 can compare the reference voltage $V_{ref}$ with the bias signal $V_{bias}$ to obtain a comparison result $CMP_{ref}$ (i.e. the reference time interval). Similarly, the comparator 454 comprises a level shifter, which is capable of converting a high level of the comparison result $CMP_{ref}$ from the analog power level $V_{dda}$ into the digital power level $V_{dd}$. The determining unit 460 comprises an XOR gate 462 and a counter 464. Two input terminals of the XOR gate 462 are respectively coupled to the output terminals of the comparator 452 and the comparator 454, so as to provide a difference signal $V_{XOR}$ according to the comparison result $CMP_{sen}$ and the comparison result $CMP_{ref}$. For example, if the comparison result $CMP_{sen}$ is different from the comparison result $CMP_{ref}$, the XOR gate 462 provides the difference signal $V_{XOR}$ with a high logic level. Conversely, if the comparison result $CMP_{sen}$ and the comparison result $CMP_{ref}$ are the same, the XOR gate 462 provides the difference signal $V_{XOR}$ with a low logic level. Furthermore, according to a clock signal CLK, the counter 464 counts the amount of cycles that the difference signal $V_{XOR}$ keeps at a high logic level. For example, the counter 464 is an up-counter. When the difference signal $V_{XOR}$ is at a high logic level, the counter 464 starts to count up from an initial value in response to the clock signal CLK until the difference signal $V_{XOR}$ changes to a low logic level. When the difference signal $V_{XOR}$ is at a low logic level, the counter 464 stops counting and provides a sensing output CNT according to the result of counting. Moreover, the clock signal CLK is provided by a clock generator 470, and the processor can control the clock generator 470 to modify the frequency of the clock signal CLK, so as to adjust the whole resolution. In one embodiment, the clock generator 470 comprises a phase lock loop (PLL). Thus, according to the sensing output CNT of each sensing unit 415, the processor can obtain the fingerprint pattern of the finger 410.

Figure 5:
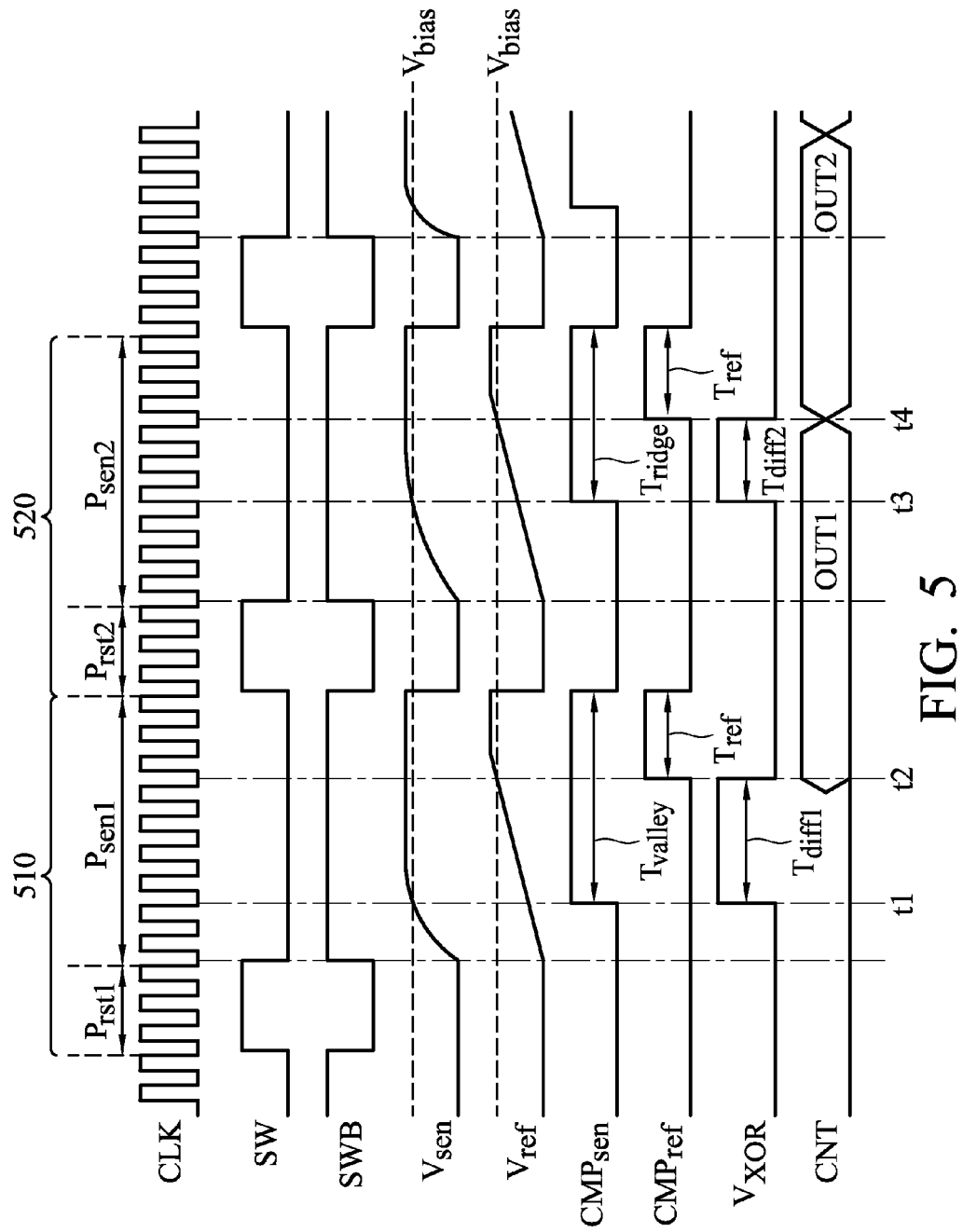
FIG. 5 shows a signal waveform of the fingerprint sensor of FIG. 4 according to an embodiment of the invention.

FIG. 5 shows a signal waveform of the fingerprint sensor 400 of FIG. 4 according to an embodiment of the invention. Referring to FIG. 4 and FIG. 5 together, when the finger 410 of the user contacts the insulating surface 420, label 510 represents an example waveform illustrating that a fingerprint valley (i.e. the sensing capacitor $C_{sen}$ is formed by the capacitors $C_{top}$, $C_1$ and $C_2$) is sensed by the sensing unit 415, and label 520 represents an example waveform illustrating that a fingerprint ridge (i.e. the sensing capacitor $C_{sen}$ is formed by the capacitors $C_{top}$ and $C_1$) is sensed by the sensing unit 415. It is to be noted that the signal waveform shown in FIG. 5 is an example and is not meant to limit the invention. First, during a reset period $P_{rst1}$, the processor provides the switching signal SW with a high logic level to the power module 430, so as to turn off the switches 432 and 437. Simultaneously, the processor provides the switching signal SWB with a low logic level to the power module 430, so as to turn on the switches 433 and 438. Thus, the sensing voltage $V_{sen}$ of the electrode E1 and the reference voltage $V_{ref}$ of the electrode E2 are respectively coupled to the ground GND via the switches 433 and 438, i.e. discharging the sensing capacitor $C_{sen}$ and the reference capacitor $C_{ref}$. Next, during a sensing period $P_{sen1}$, the processor provides the switching signal SWB with a high logic level to the power module 430, so as to turn off the switches 433 and 438. Simultaneously, the processor provides the switching signal SW with a low logic level to the power module 430, so as to turn on the switches 432 and 437. Thus, the power module 430 provides the sensing current $I_{sen}$ to charge the sensing capacitor $C_{sen}$. Simultaneously, the power module 430 also provides the reference current $I_{ref}$ to charge the reference capacitor $C_{ref}$. In the embodiment, the sensing voltage $V_{sen}$ corresponding to the sensing capacitor $C_{sen}$ is increased in a manner of resistor-capacitor (RC) effect (e.g. exponentially), and the reference voltage $V_{ref}$ corresponding to the reference capacitor $C_{ref}$ is increased in a linear manner. During the sensing period $P_{sen1}$, the comparator 452 of the comparing unit 450 compares the sensing voltage $V_{sen}$ with the bias signal $V_{bias}$ to obtain the comparison result $CMP_{sen}$ (i.e. the sensing time interval $T_{valley}$). For example, when the sensing voltage $V_{sen}$ is lower than the bias signal $V_{bias}$, the comparison result $CMP_{sen}$ falls to a low logic level. Next, at time t1, the sensing voltage $V_{sen}$ is higher than the bias signal $V_{bias}$, and the comparison result $CMP_{sen}$ becomes to a high logic level. Simultaneously, the comparator 454 of the comparing unit 450 compares the reference voltage $V_{ref}$ with the bias signal $V_{bias}$ to obtain the comparison result $CMP_{ref}$ (i.e. the reference time interval $T_{ref}$). Simultaneously, when the reference voltage $V_{ref}$ is smaller than the bias signal $V_{bias}$, the comparison result $CMP_{ref}$ becomes to a low logic level. Next, at time t2, the reference voltage $V_{ref}$ is greater than the bias signal $V_{bias}$, the comparison result $CMP_{ref}$ becomes to a high logic level. As described above, the high logic levels of the comparison result $CMP_{sen}$ and the comparison result $CMP_{ref}$ are the same as the digital power level $V_{dd}$. During the sensing period $P_{sen1}$, the XOR gate 462 of the determining unit 460 provides the difference signal $V_{XOR}$ according to the comparison result $CMP_{sen}$ and the comparison result $CMP_{ref}$. For example, a logic level of the comparison result $CMP_{sen}$ is different from that of the comparison result $CMP_{ref}$ between time t1 and time t2 (i.e. a time difference $T_{diff1}$), thus the difference signal $V_{XOR}$ is at a high logic level. Next, according to the clock signal CLK, the counter 464 counts the amount of cycles that the difference signal $V_{XOR}$ keeps at a high logic level. Next, at time t2, the logic level of the comparison result $CMP_{sen}$ is the same as the logic level of the comparison result $CMP_{ref}$, thus the difference signal $V_{XOR}$ is at a low logic level, and the counter 464 stops counting. In the embodiment, the readout module 440 converts the sensing voltage $V_{sen}$ into the sensing time interval $T_{valley}$, and converts the reference voltage $V_{ref}$ into the reference time interval $T_{ref}$, and then obtains the time difference $T_{diff1}$ between the sensing time interval $T_{valley}$ and the reference time interval $T_{ref}$ (i.e. $T_{diff1}=T_{valley}-T_{ref}$). Next, the counter 464 provides a sensing output OUT1 according to the time difference $T_{diff1}$ of the difference signal $V_{XOR}$. Thus, the processor determines whether the sensing capacitor $C_{sen}$ comprises the capacitor $C_2$ according to the sensing output OUT1, so as to determine whether it corresponds to the fingerprint ridge or the fingerprint valley. Due to the output of the counter 464 being a numerical value, the number value can be directly provided to the processor for subsequent fingerprint identification operation without an analog-to-digital converter (ADC).

Next, during a reset period $P_{rst2}$, the sensing voltage $V_{sen}$ of the electrode E1 and the reference voltage $V_{ref}$ of the electrode E2 are respectively coupled to the ground GND via the switches 433 and 438, i.e. discharging the sensing capacitor $C_{sen}$ and the reference capacitor $C_{ref}$. Next, during a sensing period $P_{sen2}$, the power module 430 provides the sensing current $I_{sen}$ to charge the sensing capacitor $C_{sen}$. Simultaneously, the power module 430 also provides the reference current $I_{ref}$ to charge the reference capacitor $C_{ref}$. In the embodiment, the sensing voltage $V_{sen}$ corresponding to the sensing capacitor $C_{sen}$ is increased in a manner of RC effect, and the reference voltage $V_{ref}$ corresponding to the reference capacitor $C_{ref}$ is increased in a linear manner. During the sensing period $P_{sen2}$, the comparator 452 of the comparing unit 450 compares the sensing voltage $V_{sen}$ with the bias signal $V_{bias}$ to obtain the comparison result $CMP_{sen}$ (i.e. the sensing time interval $T_{ridge}$). At time t3, the sensing voltage $V_{sen}$ is greater than the bias signal $V_{bias}$, and the comparison result $CMP_{sen}$ becomes to a high logic level. Simultaneously, the comparator 454 of the comparing unit 450 compares the reference voltage $V_{ref}$ with the bias signal $V_{bias}$ to obtain the comparison result $CMP_{ref}$ (i.e. the reference time interval $T_{ref}$). At time t4, the reference voltage $V_{ref}$ is greater than the bias signal $V_{bias}$, and the comparison result $CMP_{ref}$ becomes to a high logic level. As described above, the high logic levels of the comparison result $CMP_{sen}$ and the comparison result $CMP_{ref}$ are the same as the digital power level $V_{dd}$. During the sensing period $P_{sen2}$, the XOR gate 462 of the determining unit 460 provides the difference signal $V_{XOR}$ according to the comparison result $CMP_{sen}$ and the comparison result $CMP_{ref}$. For example, the logic level of the comparison result $CMP_{sen}$ is different from that of the comparison result $CMP_{ref}$ between time t3 and time t4 (i.e. a time difference $T_{diff2}$), thus the difference signal $V_{XOR}$ is at a high logic level. Next, the counter 464 counts the difference signal $V_{XOR}$ according to the clock signal CLK. Next, at time t4, the logic level of the comparison result $CMP_{sen}$ is the same as that of the comparison result $CMP_{ref}$, thus the difference signal $V_{XOR}$ is at a low logic level, and the counter 464 stops counting. In the embodiment, the readout module 440 converts the sensing voltage $V_{sen}$ into the sensing time interval $T_{ridge}$, and converts the reference voltage $V_{ref}$ into the reference time interval $T_{ref}$, so as to obtain the time difference $T_{diff2}$ according to the sensing time interval $T_{ridge}$ and the reference time interval $T_{ref}$, i.e. $T_{diff2}=T_{ridge}-T_{ref}$. Next, the counter 464 provides the sensing output OUT2 according to the difference signal $V_{XOR}$ corresponding to the time difference $T_{diff2}$. Thus, the processor determines whether the sensing capacitor $C_{sen}$ comprises the capacitor $C_2$ according to the sensing output OUT2, so as to determine it corresponds to the fingerprint ridge or the fingerprint valley. Due to the output of the counter 464 being a numerical value, the number value can be directly provided to the processor for subsequent fingerprint identification operation without an analog-to-digital converter.

According to the embodiments of the invention, the fingerprint sensor can only use the comparators to convert the sensing capacitor $C_{sen}$ into the sensing time interval $T_{sen}$ (e.g. $T_{ridge}$ and $T_{valley}$ of FIG. 5) and the reference capacitor $C_{ref}$ into the reference time interval $T_{ref}$ by using the known sensing current $I_{sen}$, the known reference current $I_{ref}$, and the known bias signal $V_{bias}$. Next, the fingerprint sensor can only use digital circuits to perform the operations to obtain the time difference $T_{diff}$ between the sensing time interval $T_{sen}$ and the reference time interval $T_{ref}$ (e.g. $T_{diff1}$ and $T_{diff2}$ of FIG. 5). Next, the fingerprint sensor can obtain the fingerprint pattern according to the sensing output CNT corresponding to the time difference $T_{diff}$, so as to perform subsequent fingerprint identification operations. Therefore, compared with the traditional fingerprint sensors that need to use the analog-to-digital converters, the fingerprint sensors of the embodiments only use fewer analog circuits without the analog-to-digital converters, thereby decreasing the chip area, power consumption, and manufacturing cost.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A capacitive fingerprint sensor, comprising:
   a sensing array, comprising a plurality of sensing units, wherein each of the sensing units comprises a sensing capacitor and a reference capacitor;
   an insulating surface disposed on the sensing array;
   a readout module, obtaining a sensing time interval corresponding to the sensing capacitor of each of the sensing units and a reference time interval corresponding to the reference capacitor of each of the sensing units during a sensing period when a finger contacts the insulating surface, and providing a sensing output according to the sensing time interval and the reference time interval to indicate a fingerprint ridge or a fingerprint valley of the finger; and
   a power module, providing a sensing current to the sensing capacitor to generate a sensing voltage, and providing a reference current to the reference capacitor to generate a reference voltage,
   wherein the readout module comprises:
      a comparing unit, comparing the sensing voltage with a bias signal to obtain a first comparison result, and comparing the reference voltage and the bias signal to obtain a second comparison result; and
      a determining unit, obtaining the sensing output according to the first comparison result and the second comparison result,
   wherein the first comparison result represents the sensing time interval corresponding to the sensing voltage, and the second comparison result represents the reference time interval corresponding to the reference voltage, wherein the sensing output represents a time difference between the sensing time interval and the reference time interval.

2. The capacitive fingerprint sensor as claimed in claim 1, wherein the readout module further receives the sensing voltage for generating the sensing time interval, receives the reference voltage for generating the reference time interval, and generates the sensing output according to the sensing time interval and the reference time interval.

3. The capacitive fingerprint sensor as claimed in claim 1, wherein the comparing unit comprises:
   a first comparator, having a non-inverting input terminal for receiving the bias signal, an inverting input terminal for receiving the sensing voltage, and an output terminal for providing the first comparison result; and
   a second comparator, having a non-inverting input terminal for receiving the bias signal, an inverting input terminal for receiving the reference voltage, and an output terminal for providing the second comparison result.

4. The capacitive fingerprint sensor as claimed in claim 3, wherein each of the first and second comparators comprises a level shifter for respectively converting a high level of the first comparison result and a high level of the second comparison result from an analog power level into a digital power level, wherein the analog power level is greater than the digital power level.

5. The capacitive fingerprint sensor as claimed in claim 1, wherein the determining unit comprises:
   an XOR gate, generating a difference signal according to the first comparison result and the second comparison result; and
   a counter, counting the difference signal according to a clock signal to provide the sensing output.

6. The capacitive fingerprint sensor as claimed in claim 1, further comprising:
   a processor, obtaining a fingerprint pattern of the finger according to the sensing output corresponding to each of the sensing units.

7. A fingerprint sensing method for a capacitive fingerprint sensor, wherein the capacitive fingerprint sensor comprises a sensing array having a plurality of sensing units and an insulating surface disposed on the sensing array, comprising:

obtaining a sensing time interval corresponding to a sensing capacitor of each of the sensing units, and a reference time interval corresponding to a reference capacitor of each of the sensing units during a sensing period when a finger contacts the insulating surface;

providing a sensing output to indicate a fingerprint ridge or a fingerprint valley of the finger according to the sensing time interval and the reference time interval;

providing a sensing current to the sensing capacitor via a power module of the capacitive fingerprint sensor, to generate a sensing voltage; and providing a reference current to the reference capacitor via the power module, to generate a reference voltage, wherein the step of providing the sensing output according to the sensing time interval and the reference time interval further comprises:

comparing the sensing voltage with a bias signal to obtain a first comparison result, by a comparing unit of the capacitive fingerprint sensor;

comparing the reference voltage with the bias signal to obtain a second comparison result, by the comparing unit; and obtaining the sensing output according the first comparison result and the second comparison result, wherein the first comparison result represents the sensing time interval corresponding to the sensing voltage, and the second comparison result represents the reference time interval corresponding to the reference voltage, wherein the sensing output represents a time difference between the sensing time interval and the reference time interval.

8. The fingerprint sensing method as claimed in claim 7, wherein the step of providing the sensing output according to the sensing time interval and the reference time interval further comprises:

generating the sensing time interval according to the sensing voltage; and generating the reference time interval according to the reference voltage.

9. The fingerprint sensing method as claimed in claim 7, wherein the comparing unit comprises:

a first comparator, having a non-inverting input terminal for receiving the bias signal, an inverting input terminal for receiving the sensing voltage, and an output terminal for providing the first comparison result; and a second comparator, having a non-inverting input terminal for receiving the bias signal, an inverting input terminal for receiving the reference voltage, and an output terminal for providing the second comparison result.

10. The fingerprint sensing method as claimed in claim 9, wherein each of the first and the second comparators comprises a level shifter for respectively converting a high level of the first comparison result and a high level of the second comparison result from an analog power level into a digital power level, wherein the analog power level is greater than the digital power level.

11. The fingerprint sensing method as claimed in claim 7, wherein the step of obtaining the sensing output according to the first comparison result and the second comparison result further comprises:

generating a difference signal according to the first comparison result and the second comparison result; and counting the difference signal according to a clock signal to provide the sensing output.

12. The fingerprint sensing method as claimed in claim 7, further comprising:

obtaining a fingerprint pattern of the finger according to the sensing output corresponding to each of the sensing units.

\* \* \* \* \*